(12) United States Patent
Mills et al.

(10) Patent No.: US 8,094,436 B2
(45) Date of Patent: Jan. 10, 2012

(54) PLUG-IN CIRCUIT BREAKER ASSEMBLY

(75) Inventors: Patrick W. Mills, Bradenton, FL (US); James M. McCormick, Bradenton, FL (US); Kevin F. Hanley, Bradenton, FL (US); Timothy R. Budd, Bradenton, FL (US)

(73) Assignee: Eaton Corporation, Cleveland, OH (US)

( * ) Notice: Subject to any disclaimer, the term of this patent is extended or adjusted under 35 U.S.C. 154(b) by 94 days.

(21) Appl. No.: 12/748,639

(22) Filed: Mar. 29, 2010

(65) Prior Publication Data

US 2011/0235244 A1 Sep. 29, 2011

(51) Int. Cl.
*H02B 1/20* (2006.01)
*H02B 5/00* (2006.01)

(52) U.S. Cl. ........ 361/636; 361/634; 361/637; 361/640; 361/647; 361/656

(58) Field of Classification Search .................. None
See application file for complete search history.

(56) References Cited

U.S. PATENT DOCUMENTS

| | | | | |
|---|---|---|---|---|
| 3,585,456 | A * | 6/1971 | Phillips, Jr. .................. | 361/663 |
| 3,767,977 | A * | 10/1973 | Bachman ...................... | 361/656 |
| 4,157,582 | A | 6/1979 | Myers | |
| 4,204,245 | A * | 5/1980 | Luke et al. ..................... | 361/644 |
| 4,491,897 | A | 1/1985 | Troebel | |
| 4,744,003 | A | 5/1988 | Koslosky et al. | |
| 5,466,974 | A | 11/1995 | Sutrina et al. | |
| 5,612,579 | A | 3/1997 | Wisbey et al. | |
| 6,039,581 | A | 3/2000 | DiMarco | |
| 6,086,388 | A * | 7/2000 | Sloey et al. .................... | 439/110 |
| 6,094,361 | A * | 7/2000 | Batten et al. .................. | 361/816 |
| 6,146,788 | A | 11/2000 | Ikeda et al. | |
| 6,313,980 | B1 * | 11/2001 | Craft et al. ..................... | 361/627 |
| 6,315,580 | B1 * | 11/2001 | Hurtubise et al. .............. | 439/82 |
| 6,414,245 | B1 * | 7/2002 | Lopp et al. ..................... | 174/255 |
| 6,431,894 | B1 | 8/2002 | Boiret et al. | |
| 6,456,203 | B1 * | 9/2002 | Schomaker et al. .......... | 340/638 |
| 6,560,123 | B1 * | 5/2003 | de Varennes et al. ......... | 361/807 |
| 6,870,729 | B2 * | 3/2005 | Johnsen et al. ............... | 361/631 |
| 6,974,333 | B2 | 12/2005 | Wildes et al. | |
| 7,052,313 | B2 | 5/2006 | Gorman | |
| 7,270,575 | B2 | 9/2007 | Krantz, Jr. et al. | |
| 7,276,436 | B2 | 10/2007 | Kawai et al. | |

(Continued)

FOREIGN PATENT DOCUMENTS

GB 2 347 280 A 8/2000

*Primary Examiner* — Boris Chervinsky
(74) *Attorney, Agent, or Firm* — Bradley J. Diedrich; Kirk D. Houser

(57) ABSTRACT

A circuit breaker assembly includes a housing, an electrical bus structure coupled to the housing, and a number of first plug-in members coupled to the electrical bus structure. A number of circuit breakers include a first surface and a second plug-in member disposed opposite the first surface. The second plug-in member of each of the number of circuit breakers is mated with a corresponding one of the number of first plug-in members. A plate member is removably coupled to the housing. The plate member includes a first surface and an opposite second surface. The first surface of the number of circuit breakers engages the opposite second surface of the plate member in order to maintain mating of each of the number of circuit breakers with the corresponding one of the number of first plug-in members.

20 Claims, 6 Drawing Sheets

U.S. PATENT DOCUMENTS

| | | |
|---|---|---|
| 7,338,331 B2 | 3/2008 | Yoon |
| 7,393,248 B2 | 7/2008 | Best et al. |
| 7,837,496 B1 | 11/2010 | Pal |
| 7,889,480 B2 * | 2/2011 | Latham .................... 361/634 |
| 2006/0152312 A1 | 7/2006 | Stanke et al. |
| 2007/0108963 A1 | 5/2007 | Wavering et al. |
| 2007/0271403 A1 | 11/2007 | Kojori |
| 2008/0160796 A1 | 7/2008 | Diessner et al. |
| 2009/0130918 A1 | 5/2009 | Nguyen et al. |
| 2009/0184574 A1 | 7/2009 | Zavidniak et al. |
| 2009/0269948 A1 | 10/2009 | Nemoz et al. |
| 2009/0273234 A1 | 11/2009 | Wavering et al. |
| 2009/0325407 A1 | 12/2009 | Nguyen et al. |
| 2010/0296229 A1 | 11/2010 | Meux et al. |
| 2011/0034058 A1 | 2/2011 | Riedel et al. |

* cited by examiner

PLUG-IN CIRCUIT BREAKER ASSEMBLY

BACKGROUND

1. Field

The disclosed concept pertains generally to circuit breakers and, more particularly, to circuit breaker assemblies, such as, for example, circuit breaker panels for a number of circuit breakers.

2. Background Information

Circuit breakers are used, for example, in aircraft electrical systems where they not only provide overcurrent protection but also serve as switches for turning equipment on and off. Aircraft or subminiature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle.

The circuit breaker push-pull handle is moved from in-to-out in order to open the corresponding load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Such circuit breakers typically include a threaded bezel. A suitable fastener, such as a nut and washer, mount the circuit breaker at a corresponding opening of an aircraft circuit breaker mounting panel. The push-pull handle passes through the bezel to the user side of the mounting panel. The circuit breaker also typically includes line and load screw terminals disposed on the opposite maintenance side of the mounting panel.

U.S. Pat. No. 5,612,579 discloses a power distribution center including at least one printed circuit board of at least one layer within a housing routing electrical power from a plurality of power feeders to a first contact on a plurality of screw-in sockets disposed within a surface of the housing. The printed circuit board routes electrical power from a second contact on the plurality of screw-in sockets to a plurality of connector ports disposed on an opposite surface of the housing. This facilitates electrical connection to external loads requiring electrical power. A plurality of manually resettable screw-in type circuit breakers are screwably seated within the screw-in sockets for switchably connecting the first contact of the screw-in sockets to the second contact. Power from the power feeders is routed to the first contact via smaller power feeders on one side of the printed circuit board.

There is room for improvement in circuit breaker assemblies.

SUMMARY

These needs and others are met by embodiments of the disclosed concept, which provide a circuit breaker assembly comprising an electrical bus structure coupled to a housing, a number of plug-in circuit breakers mated to the bus structure, and a plate member removably coupled to the housing in order to maintain mating of each of the number of circuit breakers with the bus structure.

In accordance with one aspect of the disclosed concept, a circuit breaker assembly comprises: a housing; an electrical bus structure coupled to the housing; a number of first plug-in members coupled to the electrical bus structure; a number of circuit breakers comprising a first surface, a manual operator disposed from the first surface and a second plug-in member disposed opposite the first surface, the second plug-in member of each of the number of circuit breakers being mated with a corresponding one of the number of first plug-in members; and a plate member removably coupled to the housing, the plate member comprising a first surface, an opposite second surface and a number of apertures disposed through the first surface and the opposite second surface of the plate member, wherein the manual operator passes through a corresponding one of the number of apertures, and wherein the first surface of the number of circuit breakers engages the opposite second surface of the plate member in order to maintain mating of each of the number of circuit breakers with the corresponding one of the number of first plug-in members.

The plate member may comprise a first rigid member bonded to a second flexible member; the first rigid member may form the first surface of the plate member; and the second flexible member may form the opposite second surface of the plate member.

The electrical bus structure may comprise a plurality of layers of a conductive power bus. Each of the plurality of layers may be sandwiched between two layers of a thermally conductive thermoplastic.

One of the plurality of layers may be bonded to a corresponding one of the two layers of the thermally conductive thermoplastic by an epoxy-based structural tape.

The epoxy-based structural tape may be structured to transfer epoxy upon being heated, provide a seal around a corresponding one of the plurality of layers, and bond the corresponding one of the plurality of layers to the corresponding one of the two layers of the thermally conductive thermoplastic.

The electrical bus structure may comprise a printed circuit board adjacent a layer of a thermally conductive thermoplastic. The printed circuit board may be structured to communicate a number of signals from a number of the number of circuit breakers.

A number of the number of circuit breakers may comprise a number of auxiliary contacts; and the electrical bus structure may comprise a plurality of laminated power layers and an auxiliary printed circuit board in electrical communication with the number of auxiliary contacts.

The second flexible member may be formed by a liquid silicone rubber bonded to the first rigid member.

As another aspect of the disclosed concept, a circuit breaker assembly comprises: a housing; an electrical bus structure coupled to the housing; a number of first plug-in members coupled to the electrical bus structure; a number of circuit breakers comprising a first surface and a second plug-in member disposed opposite the first surface, the second plug-in member of each of the number of circuit breakers being mated with a corresponding one of the number of first plug-in members; and a plate member removably coupled to the housing, the plate member comprising a first surface and an opposite second surface, wherein the first surface of the number of circuit breakers engages the opposite second surface of the plate member in order to maintain mating of each of the number of circuit breakers with the corresponding one of the number of first plug-in members.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "fastener" refers to any suitable connecting or tightening mechanism expressly including, but not limited to, screws, bolts, nuts (e.g., without limitation, lock nuts) and combinations thereof.

The disclosed concept is described in association with subminiature or aircraft circuit breakers, although the disclosed concept is applicable to a wide range of different circuit breakers for a wide range of different applications. Such circuit breakers can be employed, for example and without limitation, in aircraft alternating current (AC) systems having a typical frequency of about 400 Hz, but can also be used in direct current (DC) systems. It will also become evident that the disclosed concept is applicable to other types of circuit breaker panels including those used in AC systems operating at other frequencies; to larger circuit breakers, such as miniature residential or commercial circuit breakers; and to a wide range of circuit breaker applications, such as, for example, residential, commercial, industrial, aerospace, and automotive. As further non-limiting examples, both AC (e.g., without limitation, 120, 220, 480-600 VAC) operation at a wide range of frequencies (e.g., without limitation, 50, 60, 120, 400 Hz, and higher or lower frequencies) and DC operation (e.g., without limitation, 42 VDC) are possible.

Figure 1:
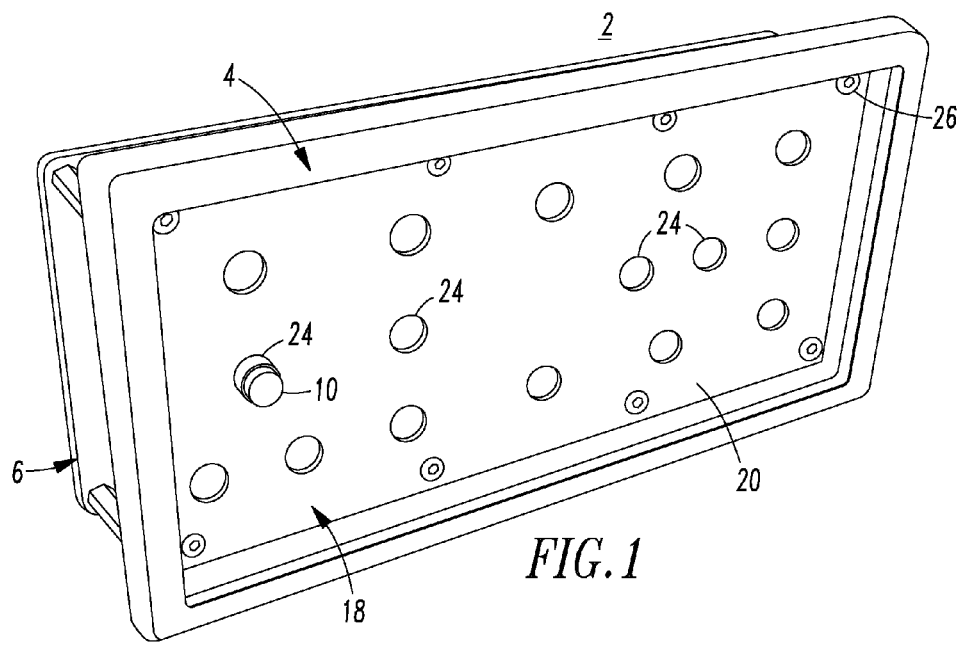
FIG. 1 is a front isometric view of a plug-in circuit breaker panel in accordance with embodiments of the disclosed concept.
Figure 2:
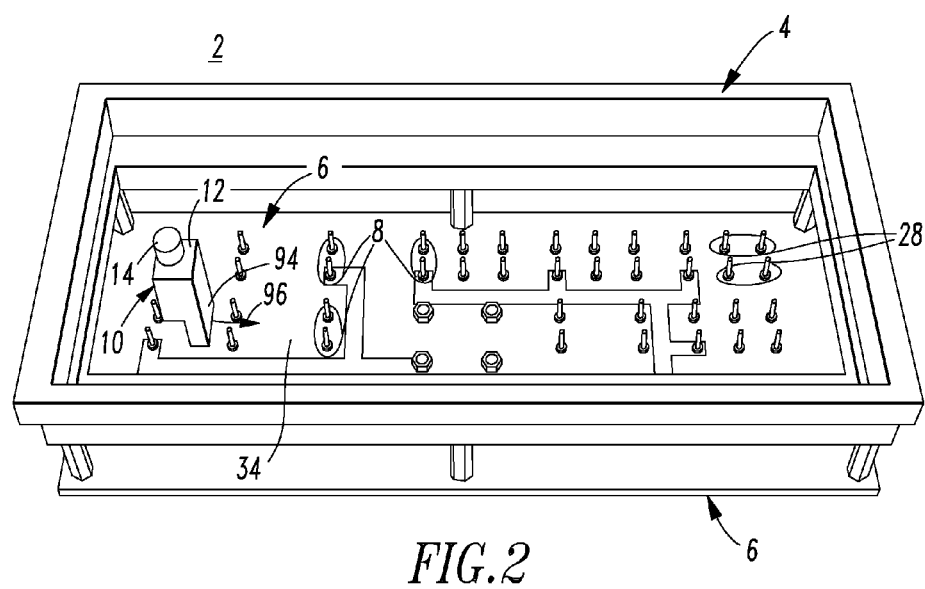
FIG. 2 is a front isometric view of the plug-in circuit breaker panel of FIG. 1 with the plate member removed.
Figure 8:
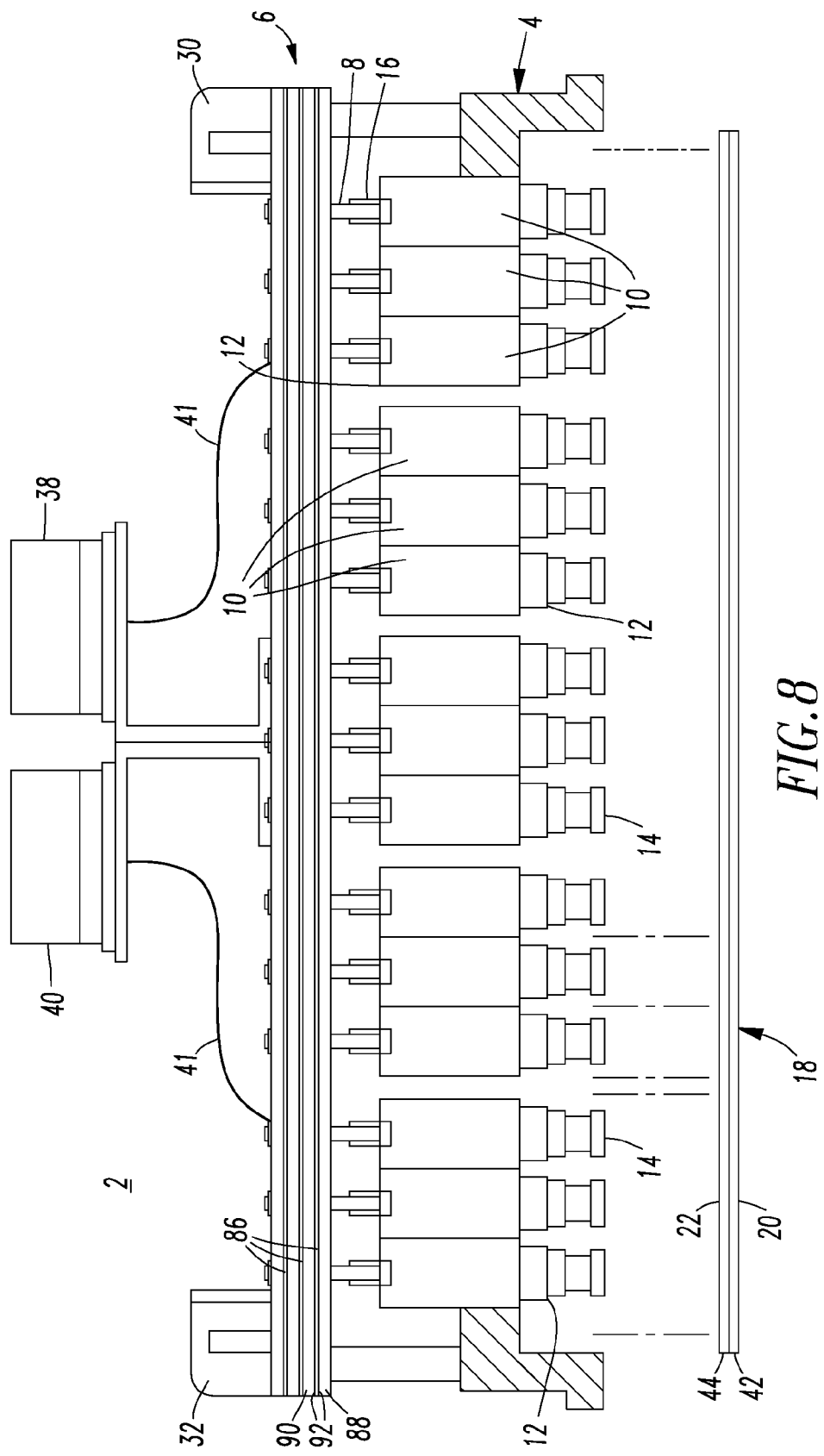
FIG. 8 is a top plan view of the plug-in circuit breaker panel of FIG. 1 showing the plate member removed.

Referring to FIGS. 1-5 and 8, a circuit breaker assembly, such as the example plug-in circuit breaker panel 2, is shown. The plug-in circuit breaker panel 2 includes a housing 4, an electrical bus structure 6 coupled to the housing 4, a number of first plug-in members 8 (as best shown in FIG. 2) coupled to the electrical bus structure 6, and a number of circuit breakers 10 (one example circuit breaker is shown in FIG. 1; 15 example circuit breakers are shown in FIG. 8).

The circuit breakers 10 include a first surface 12 (shown in FIGS. 2 and 5), a manual operator 14 (e.g., without limitation, a push-pull operating handle) disposed from the first surface 12 and a second plug-in member 16 (FIG. 8; best shown in FIG. 5) disposed opposite the first surface 12. The second plug-in member 16 of each of the circuit breakers 10 is mated with a corresponding one of first plug-in members 8. A plate member, such as the example face plate 18, is removably coupled to the housing 4. The face plate 18 includes a first surface 20, an opposite second surface 22 and a number of apertures 24 disposed through the first surface 20 and the opposite second surface 22 of the face plate 18. The manual operator 14 passes through a corresponding one of the apertures 24. The first surface 12 of the circuit breaker 10 engages the opposite second surface 22 of the face plate 18 in order to maintain mating of each of the number of circuit breakers 10 with the corresponding one of the first plug-in members 8.

The face plate 18 includes a number of captive fasteners 26 (e.g., without limitation, quarter-turn fastener(s)) removably engaging the housing 4. FIG. 2 shows the plug-in circuit breaker panel 2 with the face plate 18 (FIG. 1) removed.

The second plug-in member 16 and the mated corresponding first plug-in member 8 cooperate to provide a power input (e.g., line) to and a load output (e.g., load) from the corresponding circuit breaker 10. The power input can be, for example, a single phase AC input or a single DC input. Alternatively, the power input can be three-phase AC input as shown at three-phase plug-in member 28.

Example 1

Figure 3:
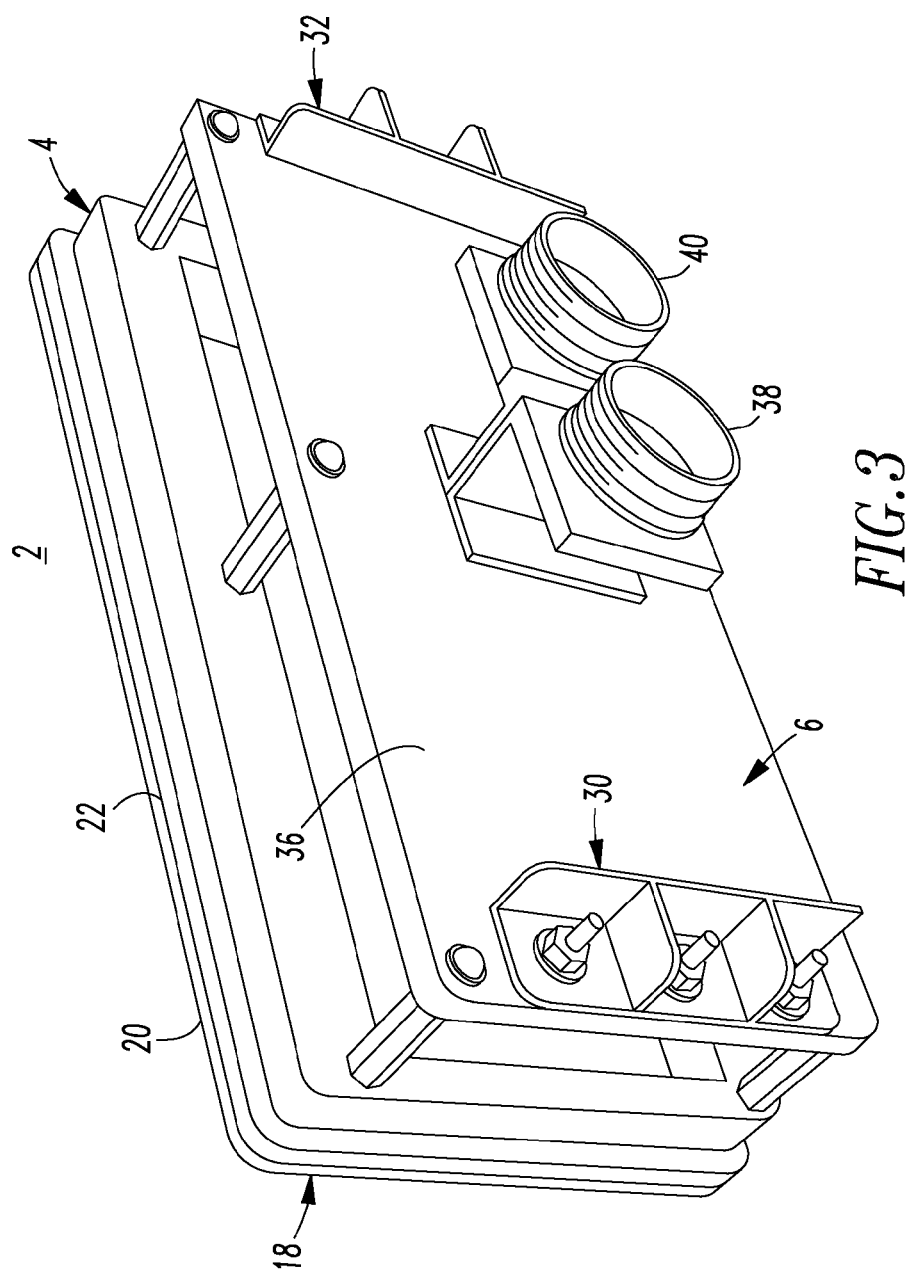
FIG. 3 is a rear isometric view of the plug-in circuit breaker panel of FIG. 1 including first and second feeders for a three-phase system.

FIG. 3 shows the rear of the plug-in circuit breaker panel 2 including first and second feeders 30,32 for a three-phase system. Typically, for each of the feeders 30,32, there can be a single three-pole AC circuit breaker (not shown) and a plurality of single pole AC circuit breakers (not shown) for each of the three phases. For example, each of the feeders 30,32 is a three-terminal terminal block having three power terminals for the three phases of the corresponding feeder. A first surface 34 (FIG. 2) of the electrical bus structure 6 is proximate the number of first plug-in members 8, and the feeders 30,32 and power terminals thereof are coupled to the opposite second surface 36 along with a number of load connectors 38,40. Here, the load connectors 38,40 include load outputs (e.g., loads) from the corresponding circuit breakers 10 associated with the respective feeders 30,32. In a similar manner, the power inputs (e.g., lines) to the corresponding circuit breakers 10 are associated with the respective feeders 30,32. The electrical bus structure 6 (e.g., a number of inner power layers thereof) suitably routes the load outputs from and the power inputs to the various circuit breakers 10. As shown in FIG. 8, the load outputs can be coupled between the electrical bus structure 6 and the connectors 38,40 by a number of conductors or ribbon cable 41.

Figure 4:
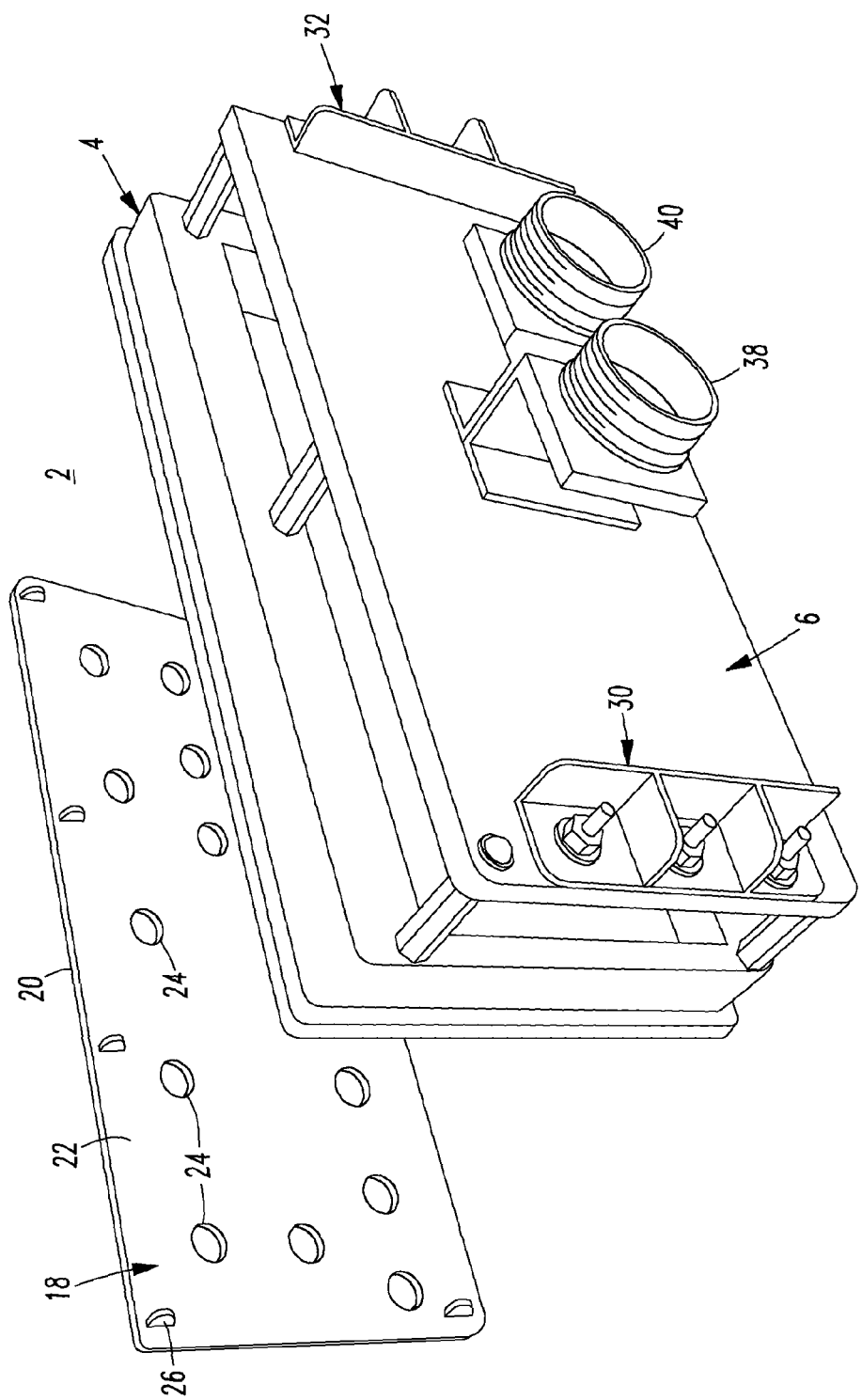
FIG. 4 is an exploded rear isometric view of the plug-in circuit breaker panel of FIG. 1 showing the plate member removed.

FIG. 4 shows the face plate 18 removed from the plug-in circuit breaker panel 2 (e.g., for maintenance or inspection of one of the various circuit breakers 10 of FIG. 1).

As shown in FIG. 8, the face plate 18 includes a first rigid member 42 bonded to a second flexible member 44. The first rigid member 42 forms the first surface 20 of the face plate 18, and the second flexible member 44 forms the opposite second surface 22 of the face plate 18. The second flexible member 44 can, for example and without limitation, be formed by a liquid silicone rubber (LSR) bonded to the first rigid member 42 (e.g., without limitation, an aluminum plate).

As shown with reference to FIGS. 1, 2, 4 and 8, the face plate 18 and the second flexible member 44 permit installation, removal and replacement of a number of the circuit breakers 10 by removing a number of the captive fasteners 26 and the circuit breaker face plate 18 in order to allow access to the number of circuit breakers 10 behind the face plate 18. The number of circuit breakers 10 are held in place with the second flexible member 44, which is compressible and provides a reliable, dampened surface abutting the circuit breaker surface 12 to hold the circuit breakers 10 in place without additional hardware. For example, the LSR can be compressed to hold the number of circuit breakers 10 in place and prevent relative motion thereof.

Example 2

Figure 5:
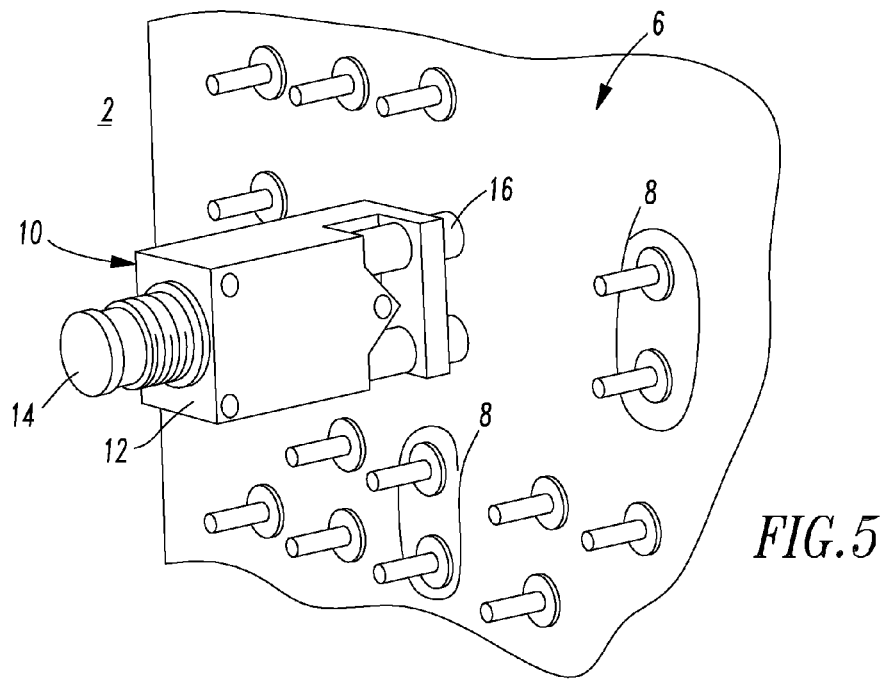
FIG. 5 is a close-up isometric view of a circuit breaker in the plug-in circuit breaker panel of FIG. 2.

FIG. 5 shows the circuit breaker 10 in the plug-in circuit breaker panel 2. Each of the number of first plug-in members 8 is a plurality of male terminals, and the second plug-in member 16 is a plurality of female sockets. Alternatively, any suitable blade-fuse type or banana plug type connection can be employed. The circuit breaker 10 can be readily changed-out utilizing these plug-in members 8,16. The use of linear motion (e.g., plug-in) circuit breaker male terminals and female sockets and the face plate 18 eliminate a threaded bushing, nut, washer, lock washer and terminal screws, which are otherwise employed for known aircraft circuit breakers. As a result, circuit breaker maintenance can be performed, for example and without limitation, in less than about five minutes versus hours for the prior method. The circuit breaker panel 2 remains fixed to the aircraft (not shown), thereby reducing moving components, and reducing wire harness lengths for access. This also reduces point-to-point wiring and other interconnections.

Example 3

Figure 6:
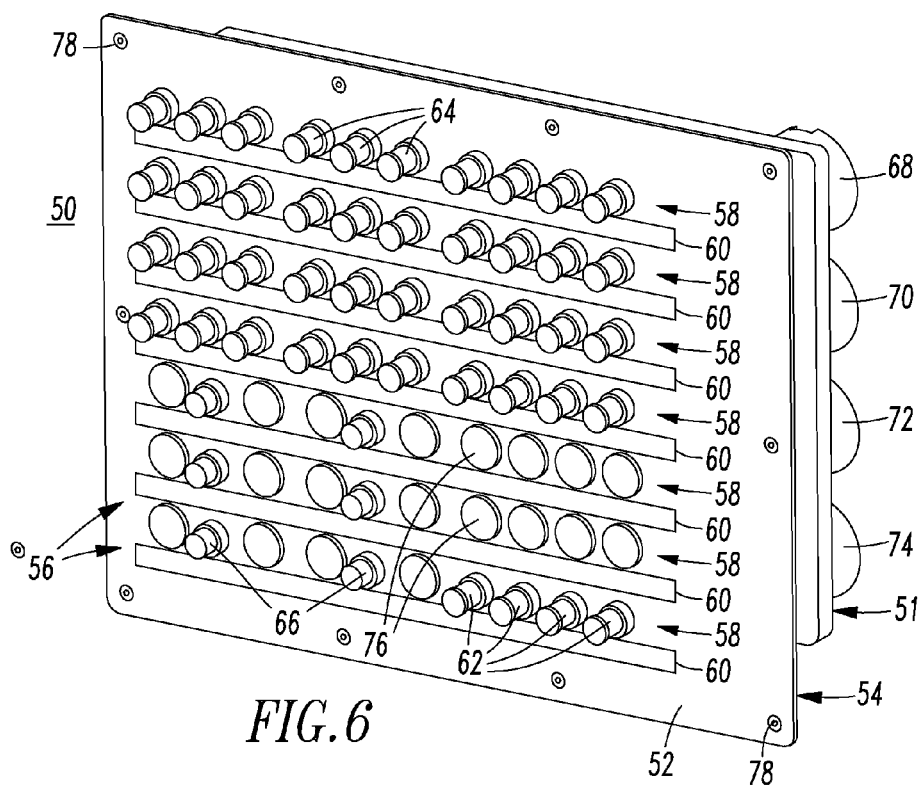
FIG. 6 is a front isometric view of a plug-in circuit breaker panel with the housing not shown in order to show internal structures in accordance with another embodiment of the disclosed concept.

Referring to FIG. 6, another plug-in circuit breaker panel 50 includes a housing (not shown, but see the housing 4 of FIG. 1) and an electrical bus structure 51, which can be the same as or similar to the electrical bus structure 6 of FIG. 1. A first surface 52 of face plate 54 includes an illuminated legend 56 for a number of the number of circuit breakers 58. LED illuminated legend strips 60 can identify a corresponding circuit breaker, such as 58, and a corresponding power circuit or load (not shown). The legend strips 60 can be structured to be easily removed and re-configured within about five minutes.

Example 4

The disclosed plug-in circuit breaker panel 50, similar to the plug-in circuit breaker panel 2 of FIG. 1, can include both AC and DC circuits of various ratings that connect between multiple aircraft buses (not shown) and individual loads (not shown). The circuit breakers 58 can include, for example and without limitation, single phase AC circuit breakers 62 (e.g., without limitation, 2.5, 3, 4, 5, 7.5, 10, 15 and 20 amperes; 50, 60, 70, 75, 80, 90 and 100 amperes), single phase DC circuit breakers 64 (e.g., without limitation, 2.5, 3, 4, 5, 7.5, 10, 15 and 20 amperes; 50, 60, 70, 75, 80, 90 and 100 amperes), and three-phase AC circuit breakers 66 (e.g., without limitation, 2.5, 3, 4, 5, 7.5, 10, 15 and 20 amperes). AC operation can be, for example and without limitation, 115 $V_{RMS}$ variable frequency (e.g., 372 Hz to 780 Hz). The example plug-in circuit breaker panel 50 can include, for example and without limitation, 40 plug-in DC circuit breakers 64 including auxiliary contacts (not shown), 4 single-phase plug-in AC circuit breakers 62 with auxiliary contacts (not shown), and 6 plug-in three-phase AC circuit breakers 66 with auxiliary contacts (not shown). However, the disclosed concept is applicable to a wide range of circuit breaker counts.

Example 5

Preferably, the size of the plug-in circuit breaker panels 2,50 can accommodate growth (e.g., without limitation, a predetermined percentage growth of circuit breaker count; a number of additional circuit breakers).

Example 6

Figure 7:
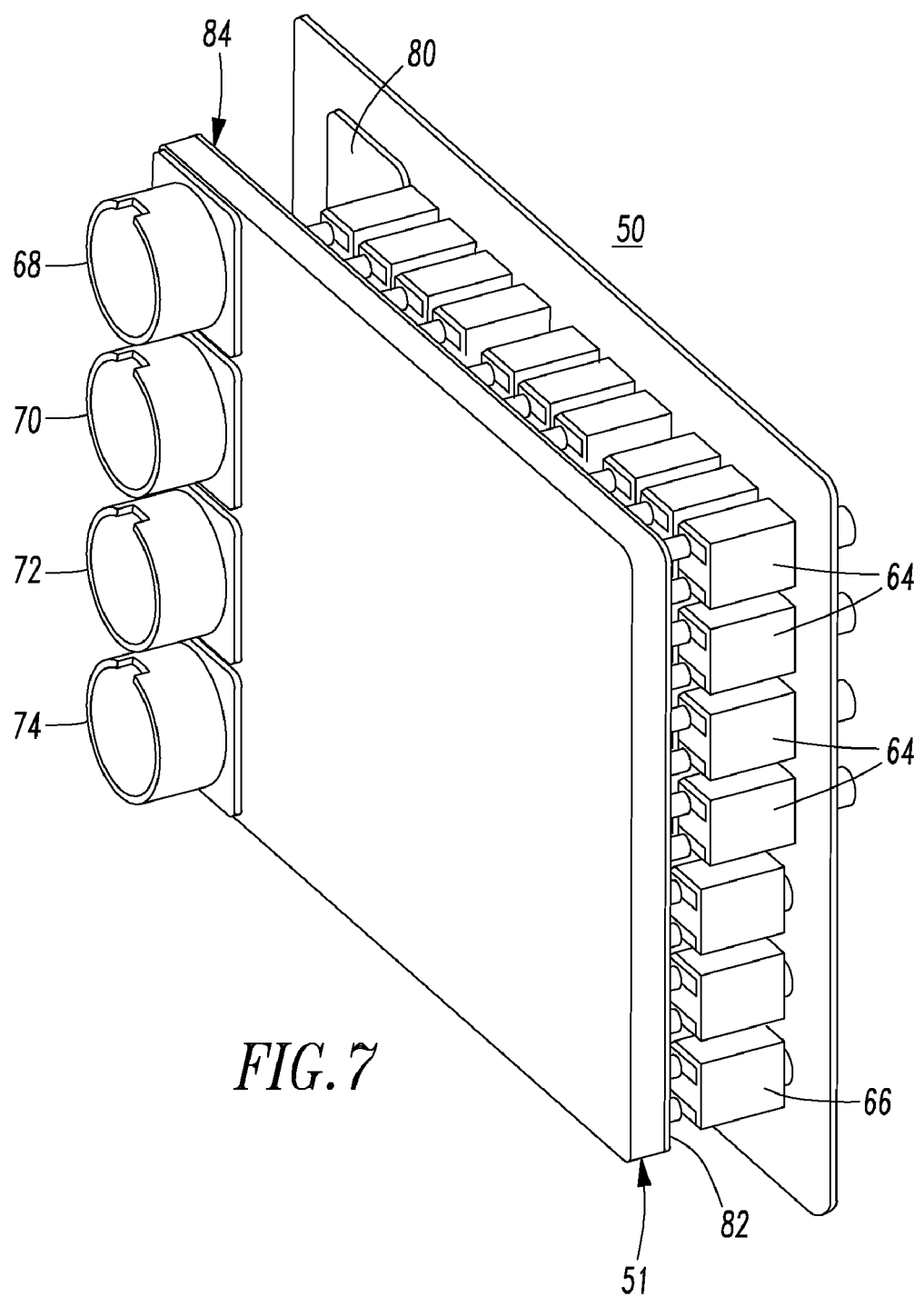
FIG. 7 is a rear isometric view of the plug-in circuit breaker panel of FIG. 6 including four connectors.

FIG. 7 shows the rear of the plug-in circuit breaker panel 50 including four example connectors 68,70,72,74. It will be appreciated that various feeders (not shown), such as, for example and without limitation, a number of three-terminal terminal blocks (for a number of AC feeders) and a number of one-terminal terminal blocks (for a number of DC feeders), can accept a number of power inputs (e.g., without limitation, a number of AC lines; a number of DC lines) from a number of feeders (not shown). The four example connectors 68,70, 72,74 provide outputs (e.g., without limitation, a number of single-phase AC loads; a number of DC loads) to a number of loads (not shown).

Example 7

The electrical bus structures 6,51 enable the respective plug-in circuit breaker panels 2,50 to provide a relatively compact size (e.g., without limitation, 8.5"×11"×3") and weight (e.g., without limitation, 11 pounds per panel).

Example 8

The example plug-in circuit breaker panel 50 of FIGS. 6 and 7 includes the multi-layer electrical bus structure 51, the example aluminum circuit breaker face plate 54 having a number of captive fasteners 78, four upper (with respect to FIG. 6) rows of the plug-in DC circuit breakers 64, and three lower (with respect to FIG. 6) rows of single and three-phase plug-in AC circuit breakers 62,66, provisions for defined spares 76, four connectors 68,70,72,74, and the illuminated removable legend strips 60.

Example 9

As shown in FIG. 7, the example plug-in circuit breaker panel 50 includes a lighting module 80, the four connectors 68,70,72,74, the electrical bus structure 51, a monitor matrix 82, an auxiliary printed circuit board (PCB) 84, and the plug-in circuit breakers 62, 66 and 64 (FIG. 6).

Example 10

FIG. 8 shows the plug-in circuit breaker panel 2 of FIG. 1 with the face plate 18 removed. The electrical bus structure 6 can include a plurality of layers 86 that form a conductive power bus. Each of the layers 86 can be sandwiched between two corresponding layers 88,90 of a thermally conductive thermoplastic. For example, one of the layers 86 can be bonded to a corresponding one of the layers 88,90 of the thermally conductive thermoplastic by an epoxy-based structural tape 92. For example, three different layers 86 can be employed for a three-phase AC application. An additional outside layer, adjacent the circuit breakers 10, can be the auxiliary PCB 84 if auxiliary contacts are employed.

The example electrical bus structure 6 can employ, for example and without limitation, a relatively thin laser cut or stamped copper bussing (not shown) (e.g., without limitation, 0.015 in. thickness for 75 A continuous current) for the layers 86. The example copper bussing can be sandwiched between the layers 88,90 of the thermally conductive thermoplastic (e.g., without limitation, 0.060 in. thickness thermally conductive LCP thermoplastic), which prevents localized heating (or hot spots).

The example layers 88,86,90 can be bonded together with the structural tape 92, such as for example and without limitation, stamped 0.020 in. thickness 3M™ VHB™ Tape marketed by 3M of St. Paul, Minn. The example structural tape 92: (1) transfers to epoxy upon being heated and is crosslinked, in order that re-heating has no effect; (2) provides a seal around the internal copper bussing, thereby creating a suitable dielectric/moisture barrier; and (3) bonds the layers 86 and 88 (or 86 and 90) together (e.g., bonds one of the layers 86 to a corresponding one of the two layers 88,90 of the thermally conductive thermoplastic).

Example 11

The example plug-in circuit breaker panel 2 is relatively very thin (e.g., without limitation, <0.375 in. thickness for relatively high power, three-phase AC panels; <0.125 in. thickness for DC panels). This approach is more economical than conventional printed circuit boards, which employ custom trace thicknesses and widths.

Example 12

The circuit breakers 10 can employ auxiliary contacts 94 (FIG. 2) that report status to an electric power system secondary power distribution assembly (not shown). For example, the layer (e.g., PCB 84) at the first surface 34 (FIG. 2) of the electrical bus structure 6 can be made from FR4 or another common circuit board material. This layer can include relatively low current sockets (not shown) and printed circuit traces (not shown) that interface with two corresponding auxiliary pins (not shown) on the circuit breaker 10 typically employed for the auxiliary signals 96 (e.g., open status; closed status). In this manner, the mains (e.g., line and load) and the auxiliary signals 96 can both employ plug-in technology. The example electrical bus structure 6 can optionally accommodate the auxiliary PCB 84 (FIG. 7) (e.g., without limitation, a conventional FR4 PCB) adjacent one of the LCP layers, such as 88,90, for signal level current, such as for example and without limitation, on/off auxiliary contacts, which can be employed to determine the status of the corresponding circuit breaker 10 (e.g., without limitation, closed; tripped/open). The PCB 84 can communicate a number of auxiliary signals 96 (FIG. 2) from a number of the circuit breakers 10 to the secondary power distribution assembly.

Example 13

The disclosed concept allows a number of the circuit breakers 10 to be readily interchanged without changing the wiring in the plug-in circuit breaker panel 2. The plug-in circuit breakers 10 can be relatively quickly removed (e.g., without limitation, in less than about one minute) and replaced without using conventional circuit breaker mounting hardware (not shown) on the front of a conventional circuit breaker panel (not shown) and without using two conventional threaded terminal screws (not shown) per circuit breaker at the back of a conventional circuit breaker panel (not shown). In contrast, the disclosed circuit breakers 10 can be safely removed from the front of the energized plug-in circuit breaker panel 2 as contrasted with the known technique of powering a circuit breaker panel (not shown) down and accessing both the front and the rear of such circuit breaker panel. For example, the disclosed concept eliminates installation error for loose terminal screws (not shown) and the possibility of dropping or losing mounting hardware (not shown) in a conventional circuit breaker panel assembly (not shown).

Example 14

The disclosed concept reduces the weight of the plug-in circuit breaker panel 2 since external power line bussing (not shown) between circuit breakers (not shown) of a conventional circuit breaker panel (not shown) is avoided. The overall height of the plug-in circuit breaker panel 2 is reduced because hinged panel mechanisms (not shown) are eliminated, rear wiring or connections (e.g., 41 of FIG. 8; any suitable flexible or rigid electrical connection) are fixed with relatively minimum bend radii, there is no need to add additional wiring for device removal from a hinged panel (not shown) to accommodate movement, there is no need for a user to configure wiring, and there is no need to bundle all the wiring behind the panel. The disclosed concept also eliminates the need for strain relief (not shown), wire ties and the like for external power line bussing (not shown) between circuit breakers. In prior aircraft panels (not shown), there is the need to open, remove and access the rear of the aircraft panels. Also, such aircraft panels require additional space behind the panels to prevent stressing the wiring behind the panels. Furthermore, since the power line and load bussing (not shown) is internal to the electrical bus structure 6 of the plug-in circuit breaker panel 2, the possibility for line-to-line shorts is reduced since numerous insulated conductors (not shown) are replaced by the example laminated electrical bus structure 6.

Example 15

The disclosed concept eliminates the use of most external wiring (not shown) and threaded connections (not shown) for circuit breakers, such as aircraft circuit breakers.

Example 16

Although circuit breakers 10 are disclosed, other applications can include relays or contactors (not shown); however, those applications are believed to employ mounting bolts (not shown) as opposed to the disclosed face plates 18,54 in order to hold a corresponding plug-in assembly (not shown) together.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. A circuit breaker assembly comprising:
   a housing;
   an electrical bus structure coupled to said housing;
   a number of first plug-in members coupled to said electrical bus structure;
   a number of circuit breakers comprising a first surface, a manual operator disposed from said first surface and a second plug-in member disposed opposite said first surface, the second plug-in member of each of said number of circuit breakers being mated with a corresponding one of said number of first plug-in members; and a plate member removably coupled to said housing, said plate member comprising a first surface, an opposite second surface and
a number of apertures disposed through the first surface and the opposite second surface of said plate member,
wherein said manual operator passes through a corresponding one of said number of apertures,
wherein the first surface of said number of circuit breakers engages the opposite second surface of said plate member in order to maintain
mating of each of said number of circuit breakers with the corresponding one of said number of first plug-in members,
wherein said electrical bus structure comprises a plurality of layers of a conductive power bus, and
wherein each of said plurality of layers is sandwiched between two layers of a thermally conductive thermoplastic.

2. The circuit breaker assembly of claim 1 wherein said plate member comprises a first rigid member bonded to a second flexible member; wherein said first rigid member forms the first surface of said plate member; and wherein said second flexible member forms the opposite second surface of said plate member.

3. The circuit breaker assembly of claim 1 wherein each of said number of first plug-in members is a plurality of male terminals; and wherein said second plug-in member is a plurality of female sockets.

4. The circuit breaker assembly of claim 1 wherein one of said plurality of layers is bonded to a corresponding one of said two layers of the thermally conductive thermoplastic by an epoxy-based structural tape.

5. The circuit breaker assembly of claim 4 wherein the epoxy-based structural tape is structured to transfer epoxy upon being heated, provide a seal around a corresponding one of said plurality of layers, and bond said corresponding one of said plurality of layers to the corresponding one of said two layers of the thermally conductive thermoplastic.

6. The circuit breaker assembly of claim 1 wherein said electrical bus structure comprises a printed circuit board sandwiched between
two layers of a thermally conductive thermoplastic.

7. The circuit breaker assembly of claim 6 wherein said printed circuit board is structured to communicate a number of signals from a number of said number of circuit breakers.

8. The circuit breaker assembly of claim 7 wherein said number of signals are a number of auxiliary signals from said number of said number of circuit breakers.

9. The circuit breaker assembly of claim 1 wherein said second plug-in member mated with the corresponding one of said number of first plug-in members cooperates to provide a power input to and a load output from a corresponding one of said number of circuit breakers.

10. The circuit breaker assembly of claim 9 wherein the power input is a single phase AC input or a single DC input.

11. The circuit breaker assembly of claim 9 wherein the power input is a three-phase AC input.

12. The circuit breaker assembly of claim 1 wherein the first surface of said plate member comprises an illuminated legend for a number of said number of circuit breakers.

13. The circuit breaker assembly of claim 1 wherein said plate member comprises a fastener removably engaging said housing.

14. A circuit breaker assembly comprising:
a housing;
an electrical bus structure coupled to said housing;
a number of first plug-in members coupled to said electrical bus structure;
a number of circuit breakers comprising a first surface, a manual operator disposed from said first surface and a second plug-in member disposed
opposite said first surface, the second plug-in member of each of said number of circuit breakers being mated with a corresponding one of said number of first plug-in members; and
a plate member removably coupled to said housing, said plate member comprising a first surface, an opposite second surface and a number
of apertures disposed through the first surface and the opposite second surface of said plate member,
wherein said manual operator passes through a corresponding one of said number of apertures,
wherein the first surface of said number of circuit breakers engages the opposite second surface of said plate member in order to maintain
mating of each of said number of circuit breakers with the corresponding one of said number of first plug-in members,
wherein a number of said number of circuit breakers comprises a number of auxiliary contacts; and
wherein said electrical bus structure comprises a plurality of laminated power layers and an auxiliary printed circuit board in electrical communication with said number of auxiliary contacts.

15. The circuit breaker assembly of claim 1 wherein said electrical bus structure comprises a first surface proximate said number of first plug-in members and an opposite second surface.

16. The circuit breaker assembly of claim 15 wherein a plurality of power terminals are coupled to the opposite second surface of said electrical bus structure.

17. The circuit breaker assembly of claim 15 wherein a number of load connectors are coupled to the opposite second surface of said electrical bus structure.

18. The circuit breaker assembly of claim 2 wherein said second flexible member is formed by a liquid silicone rubber bonded to the first rigid member.

19. The circuit breaker assembly of claim 1 wherein said manual operator is a push-pull operating handle.

20. A circuit breaker assembly comprising:
a housing;
an electrical bus structure coupled to said housing;
a number of first plug-in members coupled to said electrical bus structure;
a number of circuit breakers comprising a first surface and a second plug-in member disposed opposite said first surface, the second plug-in member of each of said number of circuit breakers being mated with a corresponding one of said number of first plug-in members; and
a plate member removably coupled to said housing, said plate member comprising a first surface and an opposite second surface,
wherein the first surface of said number of circuit breakers engages the opposite second surface of said plate member in order to maintain mating
of each of said number of circuit breakers with the corresponding one of said number of first plug-in members, wherein said electrical bus structure comprises
a plurality of layers of a conductive power bus, and wherein each of said plurality of layers is sandwiched between two layers of a thermally conductive thermoplastic.

* * * * *